(12) United States Patent
Sun et al.

(10) Patent No.: US 9,026,539 B2
(45) Date of Patent: *May 5, 2015

(54) RANKING SUPERVISED HASHING

(71) Applicant: International Business Machines Corporation, Armonk, NY (US)

(72) Inventors: Xu Sun, Atlanta, GA (US); Jun Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 13/644,747

(22) Filed: Oct. 4, 2012

(65) Prior Publication Data
US 2014/0095512 A1    Apr. 3, 2014

Related U.S. Application Data

(63) Continuation of application No. 13/630,138, filed on Sep. 28, 2012.

(51) Int. Cl.
*G06F 17/30*    (2006.01)

(52) U.S. Cl.
CPC ..................... *G06F 17/30* (2013.01)

(58) Field of Classification Search
USPC .................................... 707/723, 747
See application file for complete search history.

(56) References Cited

U.S. PATENT DOCUMENTS

| | | | |
|---|---|---|---|
| 7,617,194 B2 * | 11/2009 | Liu et al. | 1/1 |
| 7,706,530 B2 * | 4/2010 | Suga et al. | 380/44 |
| 8,005,784 B2 * | 8/2011 | Liu et al. | 706/62 |
| 8,065,309 B1 | 11/2011 | Bar-Yossef et al. | |
| 2009/0228455 A1 | 9/2009 | Hirsch et al. | |
| 2010/0070509 A1 | 3/2010 | Li et al. | |
| 2010/0179933 A1 | 7/2010 | Bai et al. | |
| 2010/0250480 A1 | 9/2010 | Cherkasova et al. | |
| 2010/0257181 A1 | 10/2010 | Zhou et al. | |
| 2011/0153707 A1 * | 6/2011 | Ginzburg et al. | 708/523 |
| 2012/0306885 A1 * | 12/2012 | Basak | 345/440 |

OTHER PUBLICATIONS

Authors: Wei Liu Jun Wang Rongrong Ji Yu-Gang Jiang Shih-Fu Chang Title: Supervised Hashing with Kernels.*
Disclosed Anonymously, "Efficient Grouping Over Joins of Compressed Tables," Apr. 6, 2010, 6 pages, IP.com No. IPCOM000194666D (www.ip.com).
Scales et al., "Efficient Matching Algorithms for the SOAR/OPS5 Production System," Jun. 30, 1986, 59 pages, IP.com No. IPCOM000150525D (www.ip.com).
Adams, Office Action Communication for U.S. Appl. No. 13/630,138 dated Jun. 18, 2014, 18 pages.

* cited by examiner

*Primary Examiner* — Jacob F Bétit
*Assistant Examiner* — Robert Adams
(74) *Attorney, Agent, or Firm* — Daniel P. Morris; Hoffman Warnick LLC

(57) ABSTRACT

Aspects of the present invention provide a tool for hash-based indexing. In an embodiment, a ranked dataset having a plurality of data items is obtained. Every data item in the ranked dataset has a ranking with respect to every other data item in the ranked dataset. A ranking triplet matrix is created based on the ranked dataset. The ranking triplet matrix has a set of ranking triplets, each of which indicates the relative ranking for a pair of the data items in the ranked dataset. This ranking triplet can be merged with a hash table obtained using a standard hash function and the data items can be indexed based on the results.

16 Claims, 6 Drawing Sheets

RANKING SUPERVISED HASHING

CROSS-REFERENCE TO RELATED APPLICATIONS

This application is a continuation of currently pending U.S. patent application Ser. No. 13/630,138 filed on Sep. 28, 2012. The application identified above is incorporated herein by reference in its entirety for all that it contains in order to provide continuity of disclosure.

TECHNICAL FIELD

The subject matter of this invention relates generally to data storage. More specifically, aspects of the present invention provide an improvement in hash-based indexing for data storage.

BACKGROUND

As information technology has developed, the amount of data in storage has increased dramatically. Storage systems have developed from simple solutions that serve a single machine to vast storage repositories that provide storage for large networks of computers. One such recent repository design is a cloud.

This evolution of storage system has precipitated a parallel development in the logic used to store the data therein. Early data storage involved storage of data in lists. These lists have an advantage of being able to preserve an order of the data. However, traversal of such lists to retrieve data therefrom becomes increasingly inefficient as the amount of data increases. Thus, more complex storage logic becomes increasingly important as the amount of data increases. To this extent, many different types of algorithms using many different types of data structures have been utilized to improve search efficiency. Many of these algorithms utilize hash functions. A hash function converts potentially multi-dimensional data into a binary data value called a hash key, which is then used for an index that can be used to retrieve the data itself from a hash table containing all of the data

SUMMARY

The inventors of the present invention have discovered that current hash functions suffer from certain deficiencies. For example, currently hashing functions have been unable to preserve ground truth orders of ranking lists. Further, there has been no way of maintaining such a ranking while still preserving an indication of distance of particular data items with respect to a particular query.

In general, aspects of the present invention provide a tool for hash-based indexing. In an embodiment, a ranked dataset having a plurality of data items is obtained. Every data item in the ranked dataset has a ranking with respect to every other data item in the ranked dataset. A ranking triplet matrix is created based on the ranked dataset. The ranking triplet matrix has a set of ranking triplets, each of which indicates the relative ranking for a pair of the data items in the ranked dataset. This ranking triplet can be merged with a hash table obtained using a standard hash function and the data items can be indexed based on the results.

A first aspect of the invention provides a method for hash-based indexing, comprising: obtaining a ranked dataset having a plurality of data items, every data item in the ranked dataset having a ranking with respect to every other data item in the ranked dataset; creating a ranking triplet matrix having a set of ranking triplets, each ranking triplet indicating a relative ranking for a pair of data items in the ranked dataset; computing a set of hash codes for the plurality of items in the ranked dataset; merging the ranking triplet matrix and the set of hash codes to get a ranking supervised hash function; and at least one of storing or retrieving at least one of the plurality of data items using the ranking supervised hash function.

A second aspect of the invention provides a system for hash-based indexing, comprising at least one computer device that performs a method, comprising: obtaining a ranked dataset having a plurality of data items, every data item in the ranked dataset having a ranking with respect to every other data item in the ranked dataset; creating a ranking triplet matrix having a set of ranking triplets, each ranking triplet indicating a relative ranking for a pair of data items in the ranked dataset; computing a set of hash codes for the plurality of items in the ranked dataset; merging the ranking triplet matrix and the set of hash codes to get a ranking supervised hash function; and at least one of storing or retrieving at least one of the plurality of data items using the ranking supervised hash function.

A third aspect of the invention provides a computer program product stored on a computer readable storage medium, which, when executed performs a method for hash-based indexing, comprising: obtaining a ranked dataset having a plurality of data items, every data item in the ranked dataset having a ranking with respect to every other data item in the ranked dataset; creating a ranking triplet matrix having a set of ranking triplets, each ranking triplet indicating a relative ranking for a pair of data items in the ranked dataset; computing a set of hash codes for the plurality of items in the ranked dataset; merging the ranking triplet matrix and the set of hash codes to get a ranking supervised hash function; and at least one of storing or retrieving at least one of the plurality of data items using the ranking supervised hash function.

A fourth aspect of the invention provides a method for deploying an application for hash-based indexing, comprising: providing a computer infrastructure being operable to: obtain a ranked dataset having a plurality of data items, every data item in the ranked dataset having a ranking with respect to every other data item in the ranked dataset; create a ranking triplet matrix having a set of ranking triplets, each ranking triplet indicating a relative ranking for a pair of data items in the ranked dataset; compute a set of hash codes for the plurality of items in the ranked dataset; merge the ranking triplet matrix and the set of hash codes to get a ranking supervised hash function; and at least one of store or retrieve at least one of the plurality of data items using the ranking supervised hash function.

Still yet, any of the components of the present invention could be deployed, managed, serviced, etc., by a service provider who offers to implement the teachings of this invention in a computer system.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
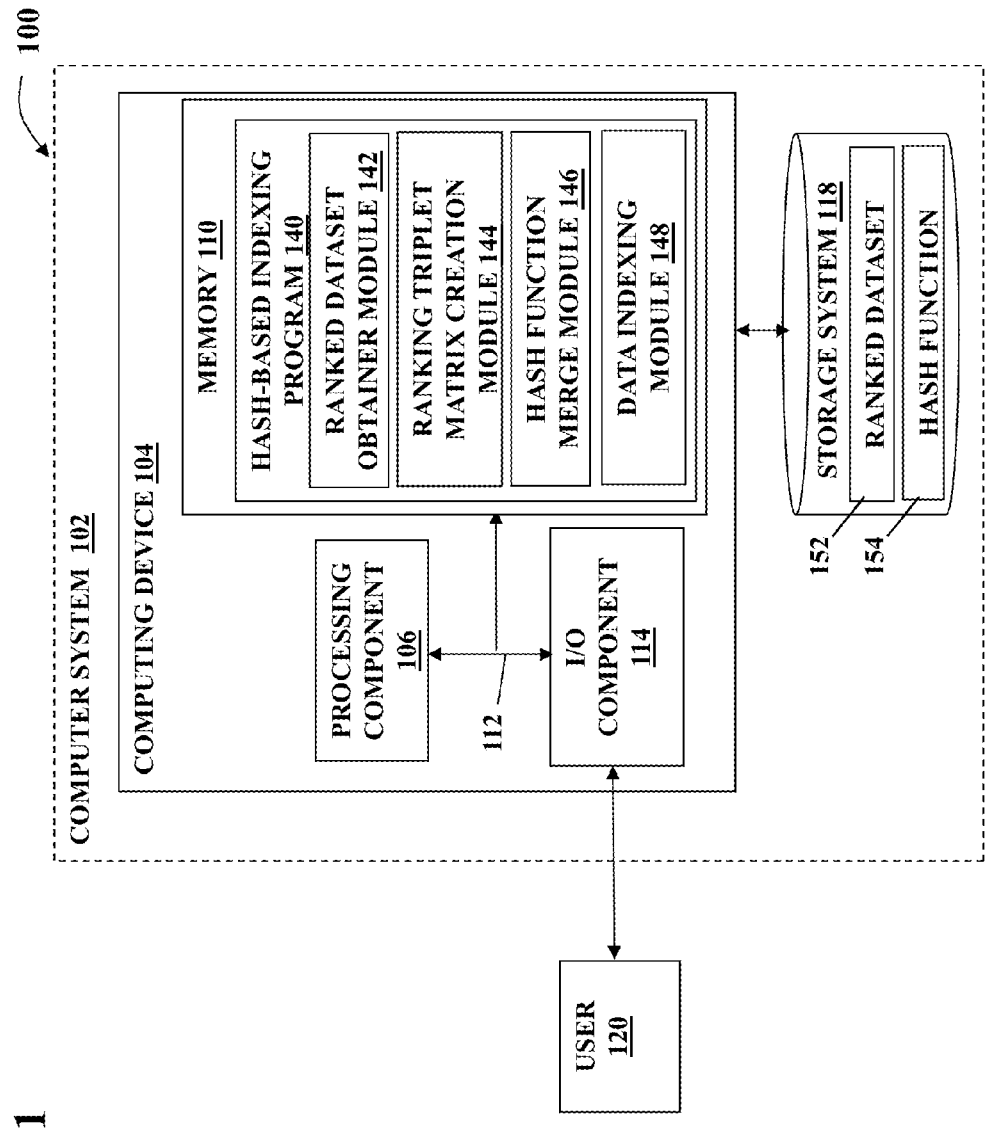
FIG. 1 shows an illustrative computer system according to embodiments of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As indicated above, aspects of the present invention provide a tool for hash-based indexing. In an embodiment, a ranked dataset having a plurality of data items is obtained. Every data item in the ranked dataset has a ranking with respect to every other data item in the ranked dataset. A ranking triplet matrix is created based on the ranked dataset. The ranking triplet matrix has a set of ranking triplets, each of which indicates the relative ranking for a pair of the data items in the ranked dataset. This ranking triplet can be merged with a hash table obtained using a standard hash function and the data items can be indexed based on the results.

Turning to the drawings, FIG. 1 shows an illustrative environment 100 for hash-based indexing. To this extent, environment 100 includes a computer system 102 that can perform a process described herein in order to provide hash-based indexing. In particular, computer system 102 is shown including a computing device 104 that includes a hash-based indexing program 140, which makes computing device 104 operable to provide hash-based indexing by performing a process described herein.

Computing device 104 is shown including a processing component 106 (e.g., one or more processors), a memory 110, a storage system 118 (e.g., a storage hierarchy), an input/output (I/O) component 114 (e.g., one or more I/O interfaces and/or devices), and a communications pathway 112. In general, processing component 106 executes program code, such as hash-based indexing program 140, which is at least partially fixed in memory 110. To this extent, processing component 106 may comprise a single processing unit, or be distributed across one or more processing units in one or more locations.

Memory 110 also can include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of temporary or permanent data storage media, including magnetic media, optical media, random access memory (RAM), read-only memory (ROM), a data cache, a data object, etc. Moreover, similar to processing component 116, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, hash-based indexing program 140 can manage a set of interfaces (e.g., graphical user interface(s), application program interface, and/or the like) that enable human and/or system users 120 to interact with hash-based indexing program 140. Users 120 could include system administrators and/or clients who need to store and/or retrieve data in a storage system environment, among others. Further, hash-based indexing program 140 can manage (e.g., store, retrieve, create, manipulate, organize, present, etc.) the data in storage system 118, including, but not limited to a ranked dataset 152 and/or a hash function 154, using any solution.

In any event, computer system 102 can comprise one or more computing devices 104 (e.g., general purpose computing articles of manufacture) capable of executing program code, such as hash-based indexing program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, hash-based indexing program 140 can be embodied as any combination of system software and/or application software. In any event, the technical effect of computer system 102 is to provide processing instructions to computing device 104 in order to perform hash-based indexing.

Further, hash-based indexing program 140 can be implemented using a set of modules 142-148. In this case, a module 142-148 can enable computer system 102 to perform a set of tasks used by hash-based indexing program 140, and can be separately developed and/or implemented apart from other portions of hash-based indexing program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of hash-based indexing program 140 fixed thereon (e.g., one or more modules 142-148). However, it is understood that computer system 102 and hash-based indexing program 140 are only representative of various possible equivalent computer systems that may perform a process described herein. To this extent, in other embodiments, the functionality provided by computer system 102 and hash-based indexing program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, hash-based indexing program 140 enables computer system 102 to provide hash-based indexing. To this extent, hash-based indexing program 140 is shown including a ranked dataset obtainer module 142, a ranking triplet matrix creation module 144, a hash function merge module 146, and a data indexing module 148.

Computer system 102, executing ranked dataset obtainer module 142, obtains a ranked dataset 152. Ranked dataset 152 includes a plurality of data items, each of which has a ranking with respect to other data items in the dataset. Ranked dataset obtainer module 142 can obtain ranked dataset 152 in any manner now known or later developed including, but not limited to: retrieval from storage system 152, entry by user 120, evaluation of a query, and/or the like.

Figure 2:
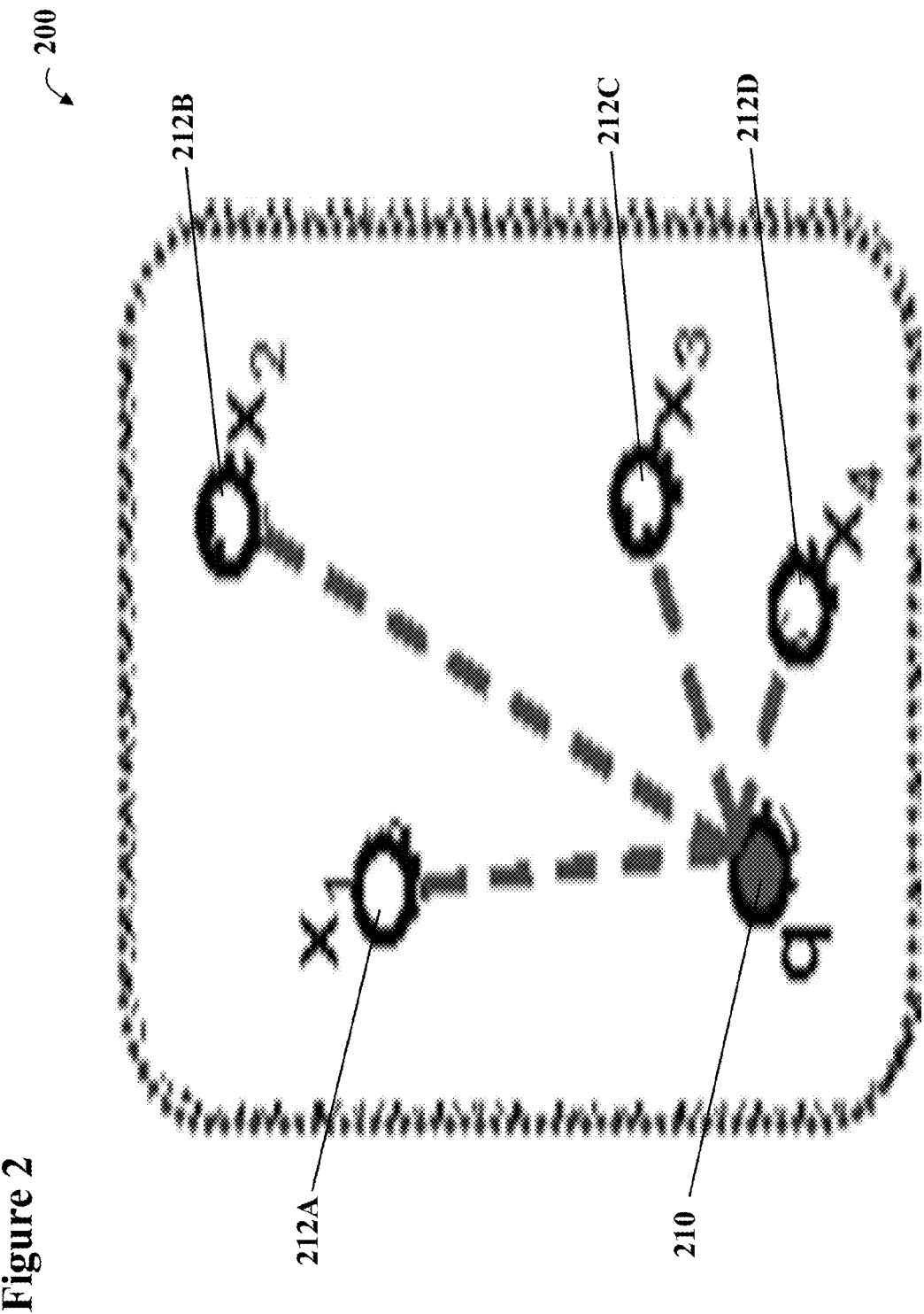
FIG. 2 shows a dataset with respect to a query according to embodiments of the invention.

Referring now to FIG. 2, a dataset 200 obtained by evaluation of a query (q) 210 according to embodiments of the invention is shown. As illustrated, query 210 is surrounded in a multi-dimensional space by a plurality of data items ($x_1$, $x_2$, $x_3$, $x_4$) 212A-D, which satisfy query 210 to varying extents. To this end, query 210 can be any user initiated request to obtain data items from an overall data storage landscape, including, but not limited to: simple keyword search, structured database search, etc. In any case, query 210 can include a set of query elements that are evaluated against data items in the multi-dimensional space to return a dataset 200 of data items 212A-D that satisfy the query 210. As can be seen from the illustration, certain data items 212A-D in dataset 200 have been determined to satisfy query 210 more closely than others. These data items 212A-D are illustrated in the figure as having a closer physical proximity to query (q) 210 than other data items 212A-D. As shown, data item $x_4$ has the closest proximity, followed by data items $x_3$, $x_1$, and $x_2$ in a rank order of proximity.

Figure 3:
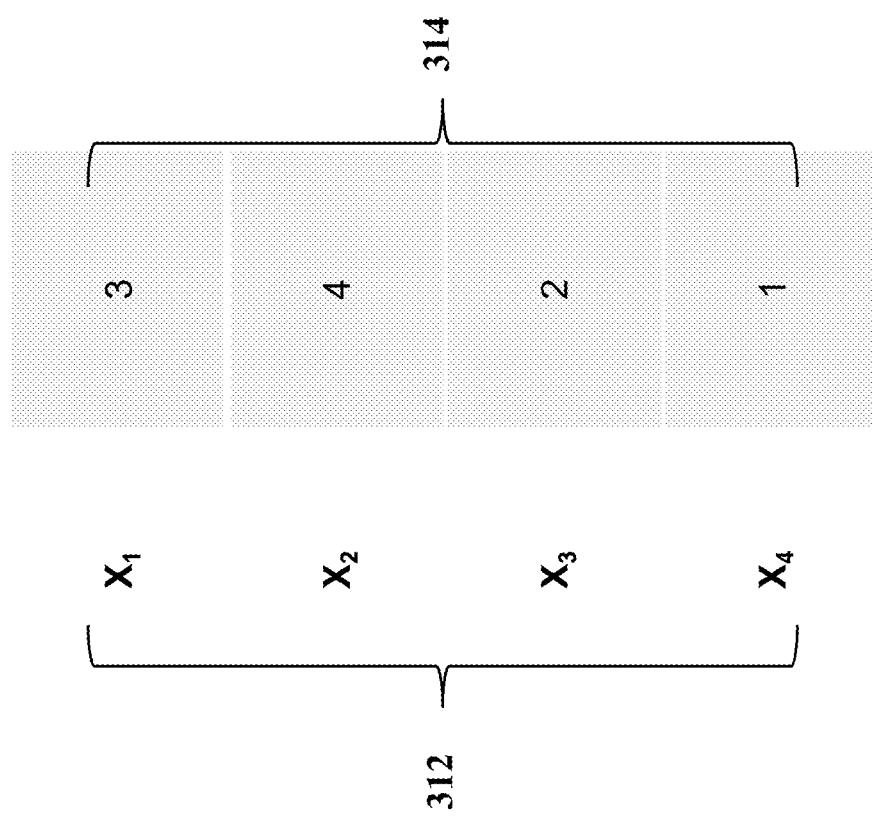
FIG. 3 shows an example ranked dataset according to embodiments of the invention.

Turning now to FIG. 3 (in conjunction with FIG. 2), an example ranked dataset 300 according to embodiments of the invention is shown. As illustrated, ranked dataset 300 includes an ordered listing 312 of data items 212A-D that were returned based on the evaluation of query 210. Associated with each data item 212A-D in the listing 312 is a ranking 314, which indicates a rank priority of the particular data item 212A-D with respect to the other data items 212A-D in listing 312. As shown, data item $x_4$ 212D has a ranking of "1", indicating that it is the highest ranked data item, followed by data item $x_3$ 212C with a ranking of "2", data item $x_1$ 212A with a ranking of "3" and data item $x_2$ 212B with a ranking of "4." Note that these numerical rankings correspond to the physical proximity of data items 212A-D to query 210.

It is understood that the illustrated embodiment of ranked dataset 300 is only one of many different embodiments that can be envisioned. For example, a ranked dataset could also take on the form of an ordered list in ascending or descending order and thus do away with numerical rankings entirely. In the alternative, rankings 314, rather than being sequential, could include weighted values that indicate a relative proximity to query 210 in the data landscape. Further, any construct, data structure, etc., that can be used to convey such ranking information that is now known or later developed can be employed to convey the results of ranked dataset 300.

In any event, referring back to FIG. 1, ranking triplet matrix creation module 144, as executed by computer system 102, can create a ranking triplet matrix from the ranked dataset 152. This ranking triplet matrix defines the ranking relationships between all of the data items in ranked dataset 152. To this extent, the ranking triplet matrix can have a set of ranking triplets with each ranking triplet indicating the relative ranking of one data item with respect one other another data item in ranked dataset 152.

Figure 4:
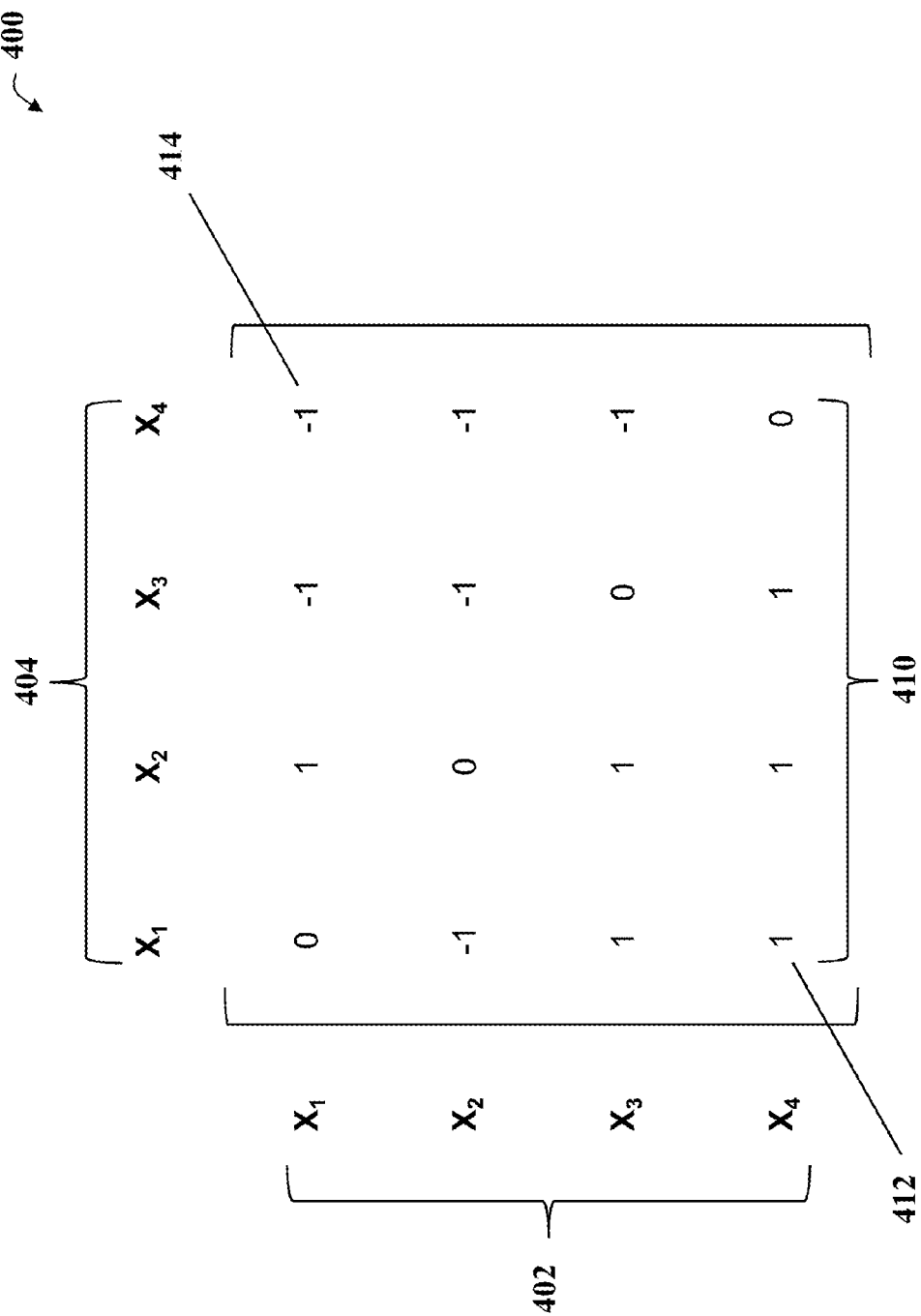
FIG. 4 shows an example ranking triplet matrix according to embodiments of the invention.

Turning now to FIG. 4 (in conjunction with FIG. 3), an example ranking triplet matrix 400 according to embodiments of the invention is shown. As illustrated, ranking triplet matrix 400 is illustrated as a two-dimensional matrix having row indicators 402 and column indicators 404 that represent the data items ($x_1$, $x_2$, $x_3$, $x_4$) in ranked dataset 300. As illustrated each intersection in ranking triplet matrix 400 has a ranking triplet 410 that indicates the priority of the data item represented by the row indicator 402 relative to the data item represented by the column indicator 404. For example, the ranking triplet 412 represented by row indicator 402 $x_4$ and column indicator 404 $x_1$ has a value of positive "1", which indicates that data item $x_4$ has a higher priority than data item $x_1$. As would be expected, the converse ranking triplet 414 represented by row indicator 402 $x_1$ and column indicator 404 $x_4$ has a value of "−1", which indicates that data item $x_1$ has a lower priority than data item $x_4$. It should, however, be understood by those skilled in the art that other values could be used.

Referring again to FIG. 1, hash function merge module 146, as executed by computer system 102, can merge the ranking triplet matrix with a set of hash codes to create a ranking supervised hash function. The set of hash codes can be obtained by evaluating a hash function over the plurality of data items. To this extent, any type of hash function now known or later developed can be used. In some embodiments, the hash function can include an unsupervised hash function, such as a spectral hash function or a graph hash function. In some embodiments, a supervised hash function, such as a data specific and/or task oriented hash code can be employed. In any case, the merging of both the ranking triplet matrix and the set of hash codes can result in a ranking supervised hash function that preserves the ranking in the ranking triplet matrix as well as any indication of proximity with respect to a query that might be included in the hash function.

Figure 5:
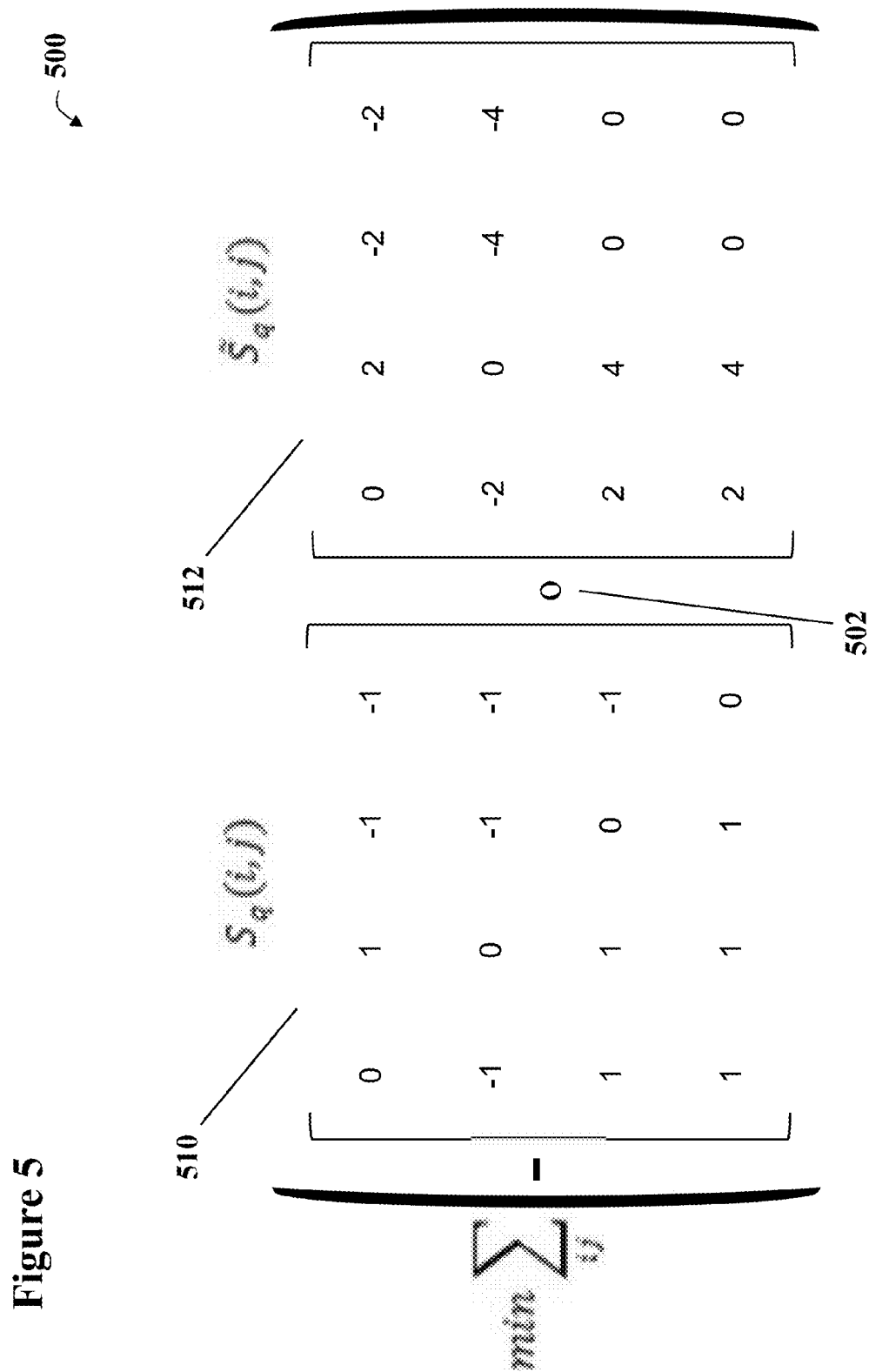
FIG. 5 shows an illustration of merging to form of a ranking supervised hash function according to embodiments of the invention.

Turning now to FIG. 5, an example merging 500 to form a ranking supervised hash function according to embodiments of the invention is shown. As illustrated, merging 500 can include a multiplication 502 of hash codes 512 (represented by $\tilde{S}_q(i,j)$) with a negative of ranking triplet matrix 510 (represented by $S_q(i,j)$). In this way, the positive or negative signs within ranking triplet matrix 510 can be propagated into the ranking supervised hash function, and thus indicate a rank order of the data items without modifying the underlying values from the hash function. This multiplying to obtain the ranking supervised hash function be performed using the following equation:

$$\min \Sigma_{ij} -\tilde{S}_q(i,j) S_q(i,j).$$

When using this equation, i and j represent a ranked pair of the plurality of data items, q is a query that returns i and j, $\tilde{S}_q$ is the ranking triplet derived from the hash codes, and $S_q$ is the ranking triplet matrix. Use of the optimization in the above equation can lead to a result that the hash function that is used can minimize any inconsistency that may otherwise occur in the ranking triplets between hash codes 512 and ranking triplet matrix 510. Thus, hash functions that act to preserve ranking information over the training dataset design can be designed.

Referring again to FIG. 1, data indexing module 148, as executed by computer system 102, can store, retrieve or do both with respect to one or any of the data items in the ranked dataset using the ranking supervised hash function. Specifically, hash indices of data items in the ranked list that have been created using the ranking supervised hash function will be recognizably related. Thus, these related indicates can be mapped to the binary hash codes space to be easily accessed by conventional look-up methods. For example, if a specific data item is located using the ranking supervised hash function, the same ranking supervised hash function can be utilized to conduct a nearest neighbor type comparison search within the environment. The results can return a next ranked data item, thus recreating the ranking contained with the original ranked dataset. This stored ranking can help facilitate more efficient storing or retrieving of related data items in a cloud environment or any other large data repository.

Figure 6:
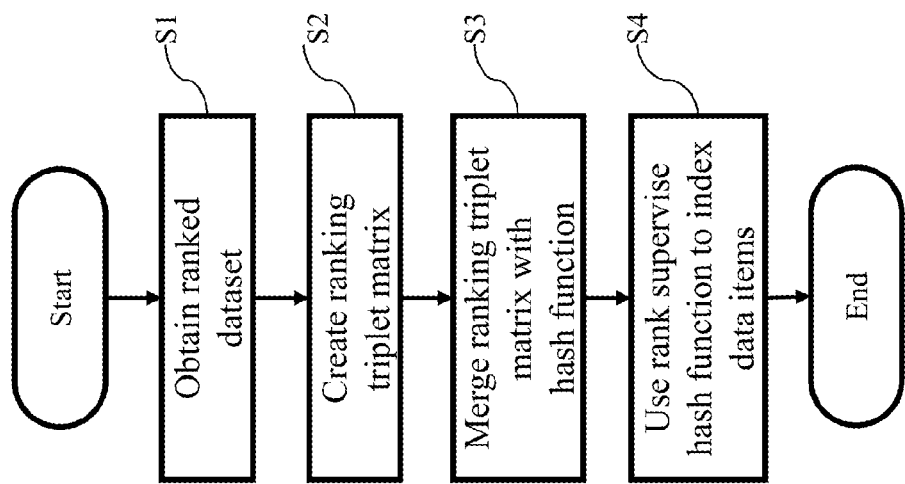
FIG. 6 shows an example flow diagram according to embodiments of the invention.

Turning now to FIG. 6, an example flow diagram according to embodiments of the invention is shown. As illustrated in FIG. 6 in conjunction with FIG. 1, in S1, ranked dataset obtainer module 142, as executed by computer system 102, obtains a ranked dataset 152 having a plurality of data items. Every item in the ranked dataset has a ranking with respect to every other data item in the ranked dataset. This ranking can be based on a proximity (relevance) to a query against the larger dataspace that returns the data items included in the ranked dataset. In S2, ranked triplet creation module 144, as executed by computer system 102, creates a ranking triplet matrix from the ranked dataset 152 having a set of ranking triplets. Each ranking triplet in the ranking triplet matrix indicates the relative ranking of one of data item within the ranked dataset 152 with respect to one other data item within the ranked dataset 152. In S3, hash function merge module 146, as executed by computer system 102, merges the ranking triplet matrix with a set of hash codes to get a ranking supervised hash function. This set of hash codes can be generated with respect to the original query and/or can utilize any hashing function now known. Further, the merging can include a multiplication of the hashing function with a negative of the ranking triplet matrix. In S4, data indexing module 148, as executed by computer system 102, uses the ranking supervised hash function to index the data items. This indexing can allow one or any of the data items in the original ranked dataset 152 to be stored and/or retrieved.

While shown and described herein as a method and system for hash-based indexing, it is understood that aspects of the invention further provide various alternative embodiments. For example, in one embodiment, the invention provides a computer program fixed in at least one computer-readable medium, which when executed, enables a computer system to provide hash-based indexing. To this extent, the computer-readable medium includes program code, such as hash-based indexing program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as hash-based indexing program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for remediating a migration-related failure. In this case, a computer system, such as computer system 120 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if and where used herein do not denote any order, quantity, or importance, but rather are used to distinguish one element from another, and the terms "a" and "an" herein do not denote a limitation of quantity, but rather denote the presence of at least one of the referenced item. The modifier "approximately", where used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for hash-based indexing, comprising at least one computer device that performs a method, comprising:

obtaining a ranked dataset having a plurality of data items, every data item in the ranked dataset having a ranking with respect to every other data item in the ranked dataset;

creating a ranking triplet matrix having a set of ranking triplets, each ranking triplet indicating a relative ranking for a pair of data items in the ranked dataset;

computing a set of hash codes for the plurality of data items in the ranked dataset;

merging the ranking triplet matrix and the set of hash codes to create a ranking supervised hash function, wherein the merging further includes multiplying the set of hash codes with a negative of the ranking triplet matrix; and at least one of storing or retrieving at least one of the plurality of data items using the ranking supervised hash function.

2. The system of claim 1, wherein the obtaining further comprises:

structuring a query having a set of query elements;

evaluating the query against a superset of the ranked dataset, wherein the evaluating returns the plurality of data items;

ranking each of the plurality of data items with respect to every other data item according to how well the data item satisfied the query elements; and returning the ranked dataset based on the ranking.

3. The system of claim 1, wherein the creating further comprises creating a two-dimensional matrix having cell values, each cell value indicating whether a data item rank of the data item represented by a matrix row is greater than, less than or equal to the data item rank of the data item represented by a column matrix column.

4. The system of claim 1, wherein the merging is performed using the equation min $\Sigma_{ij} - \tilde{S}_q(i,j) S_q(i,j)$, where:

i and j are indices of a ranked pair of the plurality of data items, q is a query that returns data items with indices i and j, $\tilde{S}_q$ is the ranking triplet matrix estimated from the set of hash codes, and $S_q$ is the ranking triplet matrix.

5. The system of claim 1, wherein the computing is performed using at least one of a spectral hash function or a graph hash function.

6. The system of claim 1, wherein the ranking supervised hash function from the merging preserves a ranking and an indication of proximity with regard to a query.

7. The system of claim 1, the method further comprising:

locating a specific data item using the ranking supervised hash function; and locating a next ranked data item to the specific data item using a nearest neighbor comparison search.

8. The system of claim 1, wherein the at least one of storing or retrieving is performed in a cloud environment.

9. A computer program product stored on a non-transitory computer readable storage medium, which, when executed performs a method for hash-based indexing, comprising:

obtaining a ranked dataset having a plurality of data items, every data item in the ranked dataset having a ranking with respect to every other data item in the ranked dataset;

creating a ranking triplet matrix having a set of ranking triplets, each ranking triplet indicating a relative ranking for a pair of data items in the ranked dataset;

computing a set of hash codes for the plurality of data items in the ranked dataset;

merging the ranking triplet matrix and the set of hash codes to get a ranking supervised hash function, wherein the merging further includes multiplying the set of hash codes with a negative of the ranking triplet matrix; and at least one of storing or retrieving at least one of the plurality of data items using the ranking supervised hash function.

10. The computer program product of claim 9, wherein the obtaining further comprises:

structuring a query having a set of query elements;

evaluating the query against a superset of the ranked dataset, wherein the evaluating returns the plurality of data items;

ranking each of the plurality of data items with respect to every other data item according to how well the data item satisfied the query elements; and returning the ranked dataset based on the ranking.

11. The computer program product of claim 9, wherein the creating further comprises creating a two-dimensional matrix having cell values, each cell value indicating whether a data item rank of the data item represented by a matrix row is greater than, less than or equal to the data item rank of the data item represented by a column matrix column.

12. The computer program product of claim 10, wherein the merging is performed using the equation min $\Sigma_{ij} - \tilde{S}_q(i,j) S_q(i,j)$, where:

i and j are indices of a ranked pair of the plurality of data items, q is a query that returns data items with indices i and j, $\tilde{S}_q$ is the ranking triplet matrix estimated from the set of hash codes, and $S_q$ is the ranking triplet matrix.

13. The computer program product of claim 9, wherein the computing is performed using at least one of a spectral hash function or a graph hash function.

14. The computer program product of claim 9, wherein the ranking supervised hash function from the merging preserves a ranking and an indication of proximity with regard to a query.

15. The computer program product of claim 9, the method further comprising:

locating a specific data item using the ranking supervised hash function; and locating a next ranked data item to the specific data item using a nearest neighbor comparison search.

16. The computer program product of claim 9, wherein the at least one of storing or retrieving is performed in a cloud environment.

* * * * *